United States Patent
Barrett

(10) Patent No.: US 12,229,724 B2
(45) Date of Patent: Feb. 18, 2025

(54) DATA COLLABORATION BETWEEN SEPARATE COMPUTER-AIDED DISPATCH SYSTEMS

(71) Applicant: Intergraph Corporation, Madison, AL (US)

(72) Inventor: Phillip Henry Barrett, Owens Cross Roads, AL (US)

(73) Assignee: Intergraph Corporation, Madison, AL (US)

( * ) Notice: Subject to any disclaimer, the term of this patent is extended or adjusted under 35 U.S.C. 154(b) by 209 days.

(21) Appl. No.: 17/566,387

(22) Filed: Dec. 30, 2021

(65) Prior Publication Data

US 2022/0391847 A1    Dec. 8, 2022

Related U.S. Application Data

(60) Provisional application No. 63/208,454, filed on Jun. 8, 2021.

(51) Int. Cl.
*G06Q 30/00* (2023.01)
*G06Q 10/0631* (2023.01)
(Continued)

(52) U.S. Cl.
CPC ... *G06Q 10/101* (2013.01); *G06Q 10/063114* (2013.01); *G06Q 50/26* (2013.01);
(Continued)

(58) Field of Classification Search
None
See application file for complete search history.

(56) References Cited

U.S. PATENT DOCUMENTS 5,353,023 A    10/1994   Mitsugi
8,234,704 B2    7/2012   Ghai et al.
(Continued)

FOREIGN PATENT DOCUMENTS

| EP | 2116954 A1 | 11/2009 |
|---|---|---|
| WO | 2019/052751 A1 | 3/2019 |
| WO | 2020/247897 A1 | 12/2020 |

OTHER PUBLICATIONS

International Searching Authority, International Search Report—International Application No. PCT/US2022/032731, dated Oct. 4, 2022 together with the Written Opinion of the International Searching Authority, 16 pages [26860-18602].

*Primary Examiner* — Matthew T Sittner
(74) *Attorney, Agent, or Firm* — Nutter McClennen & Fish LLP

(57) ABSTRACT

A computer communication system promotes collaboration between organizations by enabling secure sharing of information between organizations having separate databases. The system provides a portal generator for creation of one or more portals or channels through which data of each organization can be shared. The portals can be setup for planned or emergency events within a given region, e.g., a municipality, with tasks associated with each event. Users can register to become members of each portal, with membership being assigned automatically or with respect to predetermined criteria. In some embodiments, permissions of each member can be altered to ensure selected access to data within the channel based on the organization with which the member associates. After being registered, members can receive real-time updates on event progress from members within their organization and/or external to their organization.

12 Claims, 11 Drawing Sheets

(51) Int. Cl.
*G06Q 10/101* (2023.01)
*G06Q 50/26* (2024.01)
*H04L 9/40* (2022.01)

(52) U.S. Cl.
CPC .......... *H04L 63/101* (2013.01); *H04L 63/104* (2013.01); *H04L 63/105* (2013.01)

(56) References Cited

U.S. PATENT DOCUMENTS

| | | | |
|---|---|---|---|
| 8,763,010 | B2 | 6/2014 | Hacigumus et al. |
| 9,213,858 | B2 | 12/2015 | Sharma et al. |
| 9,749,327 | B2 | 8/2017 | Storm |
| 10,560,458 | B2 | 2/2020 | Drabant |
| 2008/0205655 | A1* | 8/2008 | Wilkins ................. G06Q 10/10 707/999.005 |
| 2008/0294640 | A1* | 11/2008 | Yost .................... G06F 16/9535 707/E17.115 |
| 2009/0100372 | A1* | 4/2009 | Lauridsen ............. G06F 16/958 715/781 |
| 2012/0144040 | A1 | 6/2012 | Hacigumus et al. |
| 2013/0211623 | A1* | 8/2013 | Thompson ............. H04L 67/12 701/1 |
| 2013/0246501 | A1 | 9/2013 | Scheer |
| 2014/0280484 | A1* | 9/2014 | Klemenz ................. H04L 67/10 709/203 |
| 2015/0347765 | A1* | 12/2015 | Hankins, Jr. ............ H04L 63/20 726/26 |
| 2016/0037001 | A1* | 2/2016 | Mummaw ............ H04N 9/8205 348/231.2 |
| 2016/0371775 | A1* | 12/2016 | Sandow ............. G06F 3/04842 |
| 2017/0223302 | A1 | 8/2017 | Conlan et al. |
| 2017/0366422 | A1* | 12/2017 | Castinado ............... H04W 4/02 |
| 2018/0092026 | A1* | 3/2018 | Patel ..................... H04W 48/08 |
| 2018/0204433 | A1 | 7/2018 | Takahashi et al. |
| 2019/0014120 | A1 | 1/2019 | Drabant |
| 2019/0354979 | A1 | 11/2019 | Crawford |
| 2019/0394206 | A1* | 12/2019 | Zezza ................... H04L 63/105 |
| 2020/0151360 | A1 | 5/2020 | Zavesky et al. |
| 2020/0192897 | A1 | 6/2020 | Halstead et al. |
| 2020/0204848 | A1 | 6/2020 | Johnson et al. |
| 2020/0389505 | A1* | 12/2020 | Bailey ................. H04L 67/1097 |
| 2020/0389595 | A1 | 12/2020 | Zhou et al. |
| 2021/0117489 | A1* | 4/2021 | Wise ................. G06F 16/9536 |
| 2021/0224753 | A1* | 7/2021 | Nasir ................. G06Q 10/1095 |

\* cited by examiner

DATA COLLABORATION BETWEEN SEPARATE COMPUTER-AIDED DISPATCH SYSTEMS

RELATED APPLICATIONS

This application claims priority to U.S. Provisional Application No. 63/208,454, filed Jun. 8, 2021 and titled "Data Collaboration Between Separate Computer-Aided Dispatch Systems" and naming Phillip Henry Barrett as inventor This application is also related to U.S. non-provisional patent application Ser. No. 16/895,610, filed Jun. 8, 2020 and titled "Data Sharing Control Methods and Systems," and naming Mark Bailey, Phillip Barrett, Joshua Beard, Jeremy Leshko, Jared Phillips, and Lawrence C. Levert IV as inventors.

This application is also related to international patent application no. PCT/US2020/036528, filed Jun. 7, 2020 and titled "Data Sharing Control Methods and Systems," and naming Mark Bailey, Phillip Barrett, Joshua Beard, Jeremy Leshko, Jared Phillips, and Lawrence C. Levert IV as applicants and inventors, and published 10 Dec. 2020 as International Publication Number WO 2020/247897 A1.

This application is also related to U.S. provisional patent application No. 62/858,447, filed Jun. 7, 2019 and titled "Project Galileo-Spark," and naming Mark Bailey, Phillip Barrett, Joshua Beard, Jamila Harbin, Jeremy Leshko, and Jared Phillips as inventors.

The disclosures of all of the foregoing are incorporated herein by reference, in their entirety.

TECHNICAL FIELD

Embodiments generally relate to facilitating access to data on a computer system, more particularly, embodiments relate to facilitating access to data on a plurality of disparate systems by a plurality of parties.

BACKGROUND ART

Management of events, projects, emergencies, and day-to-day activities is a key function of our governments. The land mass, population, availability of resources, and overall scope of the people and place being managed can vary widely from small villages, to suburban towns, to large city centers. For example, in the United States, neighborhoods, are grouped into towns or cities, which make up counties, that form states, with a federal government overseeing the day-to-day operations of the country as a whole. At each level of government, there are organizations tasked with overseeing the well-being of the people who reside within its borders. In order to perform their function efficiently, these organizations collaborate to help resolve incidents issues that arise under their purview. Due to the large number of organizations, some of which have limited specialties, when issues arise that require the cooperation of multiple organizations and/or departments within said organizations, coordinating their participation can be problematic. For example, in some cases, contacts are not immediately available or known for particular departments, or, even when their identity is known, the relevant party cannot be reached or is on vacation. Moreover, even when the contact is available, the contact may not have direct knowledge of the full scope of work required, which necessitates informing other parts of the department, which can be time-consuming and inefficient. These broken lines of communications waste valuable time in trying to resolve issues, some of which can be the result of emergencies, where time is of the essence.

Existing solutions for promoting collaboration among a plurality of groups have significant shortcomings. For example, existing solutions known to the inventors can bring data into a single repository, but do not make associations with the data or the use the data proactively for tracking or developing a streamlined process therefrom. Traffic lights having cameras can be connected to utility poles, but there is no interface for the Department of Transportation to interact with the utility company when issues arise with the system, thereby making it harder to diagnose whether faulty equipment should be fixed by the utility company or the Department of Transportation. Second, to the extent the data is brought into the repository, this data is collected manually rather than automatically. That is, existing solutions only allow people to see updates that they have been explicitly given access to by others. Moreover, minimal collaboration results from existing solutions.

SUMMARY OF VARIOUS EMBODIMENTS

Various embodiments of the present disclosure generally relate to promoting collaboration between organizations, e.g., various departments in a municipality, and more specifically, relates to a platform that enables sharing of data from organizations' databases without having direct access to each other's networks for coordinating tasks and action items between the organizations.

In a first embodiment, a computer-based communication platform includes a portal generator configured to generate a plurality of separate portals, each portal being accessible by a plurality of municipal groups, each municipal group of the plurality of municipal groups having:
 (i) a corresponding computer aided dispatch system; and
 (ii) a corresponding secured database, the corresponding secured database accessible to the municipal group, but not directly accessible by other municipal groups of the plurality of municipal groups, the corresponding secured database having different information from the information held in at least one of the other secured database of another municipal group of the plurality of municipal groups;

The platform of the first embodiment also includes a registrar configured to: (a) register, to the platform, each municipal group of the plurality of municipal groups, each such municipal group being a registered municipal group; and to (b) assign, for each registered municipal group, access to at least one of the portals as a function of information relating to registering said registered municipal group, each such registered member being a registered member of its corresponding assigned portal.

The platform of the first embodiment also includes a database interface configured to communicate with the secured databases corresponding to the plurality of municipal groups.

The platform of the first embodiment also includes a database manager configured to selectively grant access to a secured database of the plurality of municipal groups for each of the portals, said database being a requested database, said access being granted access for a given portal being a function of the registered municipal group requesting access and/or a specific requester, the granted access being for less than the entirety of the requested database; and a display manager configured to display selected information retrieved from the secured databases and showing updates, the display being configured to display different groups of information in one of a plurality of different orders.

In some embodiments, the registrar is further configured to (c) cause the portal generator to generate a new portal in response to the information relating to registering said registered municipal group.

In some embodiments, the information from each secure database is accessible via the plurality of separate portals, the plurality of separate portals allowing for one or more of viewing, editing, searching, or updating the information within the portal.

In some embodiments, the updates shown by the display manager are updated in real-time.

In some embodiments, the plurality of different orders includes one or more of time, task, group, or responsible party.

In some embodiments, the database manager is further configurable to permit different database access levels to different municipal groups and/or specific requesters. Moreover, in some such embodiments access is assigned based on one or more of a type of municipal group, a member's job rank within the registering municipal group, or a member's duration of employment within the registering municipal group.

In some embodiments, the platform is configured to create at least one portal of the plurality of portals automatically in response to an event contained within the database of one or more of the municipal groups.

Some embodiments further include a machine learning module configured to analyze the selected information to create tasks based on previous assignment of tasks to members of the given portal.

In some embodiments, each portal of the plurality of separate portals is generated based on at least one of a geography, an event, or an incident.

In some embodiments, the platform is configured to send an electronic message to at least one of the plurality of registered municipal groups in response to a selected event recognized by a given portal.

Another embodiment provides a method of using a channel of a computer collaboration system. The method includes: registering a set of members to the channel, each member of the set of members being a registered member, and having a corresponding computer aided dispatch system, said channel corresponding with an event, the event having one or more tasks being tracked therein; sharing data associated with the task with registered members; selecting a task from the one or more tasks; coordinating performance of a portion of the task between the registered members of the channel; and updating, to a computer display, a status of the portion of the task following performance of activities associated with the task.

In some embodiments of the method, each registered member requesting access to a database is a requesting municipal group and the database is a requested database, and selected access to each channel is granted based on a nature of the requesting municipal group and/or a specific requester, the selected access being for less than the entirety of the requested database.

Some embodiments of the method include monitoring activities being performed with respect to the task. In some such embodiments, monitoring further includes updating, to the computer display, status of the portion of the task following performance of activities associated with the task in real-time.

In some embodiments of the method, coordinating performance further includes bringing together updates from a plurality of secure databases, and assigning portions of the task to the one or more members of the channel. In some such embodiments, assignment of portions of the task occurs substantially automatically.

Another embodiment includes a computer program product for use on a computer system for collaborating between disparate organizations, the computer program product including a tangible, non-transient computer usable medium having computer readable program code thereon. The computer readable program code includes code for generating a plurality of separate portals, each portal being accessible by a plurality of municipal groups having computer aided dispatch systems, each municipal group of the plurality of municipal groups having: (i) a corresponding computer aided dispatch system; and (ii) a corresponding secured database, the corresponding secured database accessible to the municipal group, but not directly accessible by the other municipal groups of the plurality of municipal groups, the corresponding secured database having different information from the information in at least one of the other secured database of another municipal group of the plurality of municipal groups. The computer readable program code also includes code for registering municipal groups to one or more the plurality of portals, the code for registering municipal groups configured to (a) register, to the platform, each municipal group of the plurality of municipal groups, each such municipal group being a registered municipal group; and to (b) assign access of each registered municipal group to at least one of the portals as a function of information relating to a registering municipal group.

The computer readable program code includes code for communicating with secured databases for the plurality of municipal groups; code for selectively controlling access to the databases of the plurality of municipal groups for each of the portals, the selected access for a given portal being a function of the requesting municipal group and/or a specific requester, the selected access being for less than the entirety of the requested database; and code for displaying selected information retrieved from the secured databases and showing updates, the display being configured to display different groups of information in one of a plurality of different orders.

In some embodiments, the code for selected access for a given portal is a function of the requesting municipal group and/or a specific requester, the selected access being for less than the entirety of the requested database.

Some embodiments also include code for machine learning configured to analyze the selected information to create tasks based on previous assignment of tasks to members of the given portal.

BRIEF DESCRIPTION OF THE DRAWINGS

Those skilled in the art should more fully appreciate advantages of various embodiments from the following "Description of Illustrative Embodiments," discussed with reference to the drawings summarized immediately below.

DESCRIPTION OF ILLUSTRATIVE EMBODIMENTS

Figure 1:
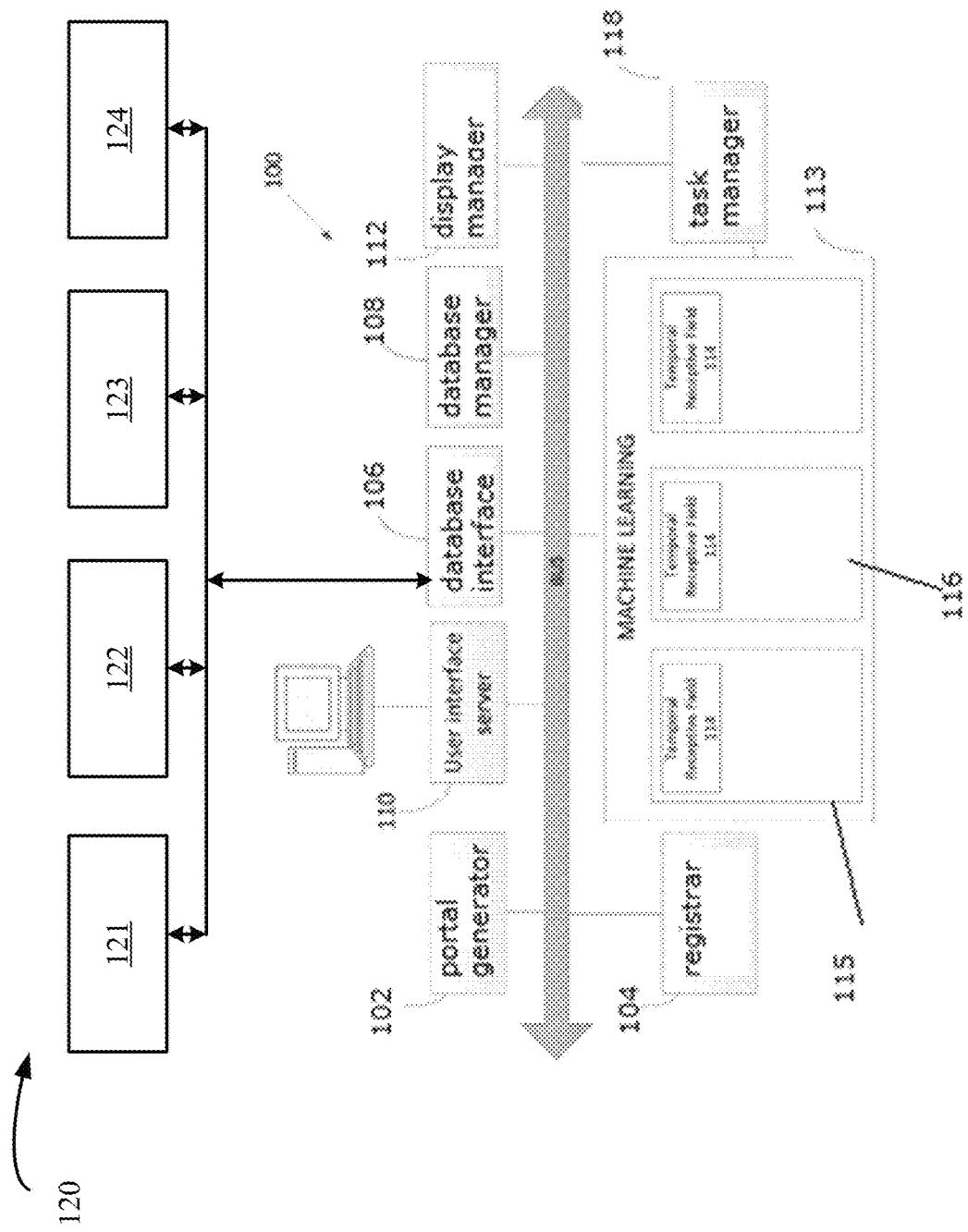
FIG. 1 schematically shows a system for creating channels that promote collaboration between organizations in accordance with illustrative embodiments of the present disclosure.

Illustrative embodiments provide an interface to allow improved communication and/or collaboration between various entities. For example, the various entities may be sections (e.g., agencies) of the government of a municipality or other political unit (e.g., county; state; etc.). In illustrative embodiments, the system of the present disclosure can facilitate cross-agency collaboration and provide a consolidated view from disparate systems to promote communication between disparate organizations in real-time.

For example, in illustrative embodiments the system includes a computer communication platform configured to create one or more portals or channels to facilitate collaboration between different entities, with data contained within different organizations or departments. Municipalities can have a wide range of such entities, each of which may be referred-to as an agency (e.g., organizations and/or departments) that provide services for maintaining operations within its borders. Some non-limiting examples of such agencies include a fire department, emergency services, hospitals, police stations, traffic controllers, utility companies, city hall, and so forth. The channels can enable groups to communicate with respect to one or more subjects with data sharing and alerts with real-time updates. The channels can be created manually or automatically upon the occurrence of a particular event. Each channel can allow a user or a group to become a member, either via creation of the channel or invitation to become a member of the channel. Members are able to view, edit, and update statuses, tasks, and other data within the channel that can be broadcast to other members of the channel. In some embodiments, permissions (such as rule-based permissions) for each member can be customized to determine the type of data that each member interacts with within the channel. Channels can also show history and automatic updates from everyone's system of record, which will reduce the time spent contacting specific departments when attempting to resolve and issue.

In illustrative embodiments, each entity (e.g., each municipal group) has a secure database (which may be referred-to as a "secured" database) to which that entity has direct access, but other entities do not have direct access. Access to data or a database via a portal or channel as described herein does not constituent "direct" access.

In illustrative embodiments, a first group may have a first secure database maintained on corresponding first computer network, and other groups do not have access to that first secure database, for example because other groups do not have access to the first computer network, and/or do not have credentials to allow said entity to access the first secure database. For example, a police department may have a secure police database (which may be on a corresponding police network), but the utility company may not have access to the secure police database (for example, because the utility company may not have appropriate credentials to access the first police database, and/or does not have access to the police's computer network). The benefit of restricting utility company access to the secure police database includes protecting sensitive information from exposure to the utility company, such as information about undercover operations; the identity of undercover police agents and informants; and other non-public information, to name but a few examples. Consequently, a secure database of an entity or group is a database to which access is controlled by the entity or group. For example, a secure database may be behind a wall or other security apparatus that limits access to the secure database to persons or entities with appropriate credentials (e.g., passwords), and/or a secure database may be on a corresponding network to which other persons or entities do not have access.

Some embodiments allow access to some or all of the content of a secure database to an entity or group that does not have direct access to the secure database. In keeping with the foregoing illustrative example, illustrative embodiment may allow a utility company to have access through a portal to some or all of a secure police database, without giving the utility company direct access to the secure police database, or access to the corresponding police network.

Consequently, illustrative embodiments address the challenge of allowing a given entity to retain its data on its own secure database, yet without sending a copy of that data to another database, and without having to trust such another database and the operator of such another database to limit access to that data, and even while allowing the given entity to maintain its data on a secured network to which the given entity has data access, but other entities do not have data access, while still allowing controlled access to some or all of that data by another party, which party does not have direct access to the secure database of the given entity, and/or to the network of the given party.

illustrative embodiments address the challenge of allowing a first entity (e.g., a "requesting") entity to gain access to data on the secure database of a second entity (e.g., another entity distinct from the first entity), for example in computer environments in which the secure database is on a network of the second entity and the requesting entity does not have access to the network of the second entity.

As described herein, illustrative embodiments of a communication platform, and a method executed by a communication platform, may control access to data in a secured database of a given entity by applying one or more of the following controls:

(a) limiting access to such data by requiring that an entity (other than the given entity) desiring to access the data (which registered member may be referred-to as a "requesting" entity or "requesting" member) be registered to the system (i.e., requiring that an entity (other than the given entity) desiring to access the data be a registered entity); and/or (b) limiting access to such data by requiring that a registered entity (other than the given entity) desiring to access the data be assigned to a portal or channel having authorized access to the data (e.g., where each such registered entity may be referred-to as a member of the channel, and such members may be referred-to collectively as members of the channel; in some embodiments, (e.g., registrar 104 can assign the members or groups access to the portals based on system permissions or user requests); and/or (c) limiting access to such data by defining a limited set of data from the secure database that a registered entity may access (e.g., database interface 106 can be customized to allow reading of specific information from each database to determine which information is to be shared with registered members of the channel) (e.g., permissions can dictate data sharing rules to allow administrators to regulate the type of data that requesting members may access and receive); and/or (d) limiting access by a registered member to such data as a function of the requesting member or group, with access being given to a portion and/or an entirety of the database; and/or (e) limiting access by a registered member to such data pursuant to predetermined rules that are customized by each member, or customized by the given group.

Definitions: As used in this description and the accompanying claims, the following terms shall have the meanings indicated, unless the context otherwise requires.

The acronym "CAD" means "Computer-Aided Dispatch."

A "secure database" is a database storing content data, to which content access is limited. In some embodiments, a secure database is a database on a corresponding computer network and to which data access is limited to a set of entities, in which each entity of the set of entities has access to the corresponding computer network. Alternatively, or in addition, in some embodiments, a secure database is a database to which data access is limited to a set of entities, in which each entity of the set of entities meets a set of pre-defined criteria.

A "set" includes at least one member.

Certain illustrative embodiments will now be described to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure. Moreover, one skilled in the art will recognize that the ranges disclosed in the present application are approximate and merely exemplary.

FIG. 1 schematically shows an embodiment of a system or communication platform 100 for data collaboration between various departments of a municipality in accordance with present embodiments. The communication platform 100 has a portal generator 102 configured to create one or more portals or channels for collaboration or sharing of data between groups and/or members. After the platform is created, the portal generator can allow the portals to be accessed by computer aided dispatch systems of various members of municipal groups. It will be appreciated that a plurality of portals can be created by the portal generator to allow users to become members of various channels in accordance with user preference or system settings, as described further below.

The system 100 can include a registrar 104 configured to register one or more groups and/or members to the portals created by the portal generator 102. The registrar 104 can assign the members or groups access to the portals based on system permissions or user requests. For example, the registrar 104 can receive information that a user wishes to register to the "police" portal and approves access to this portal based on information collected from the user. Some non-limiting examples of information that can be collected from the user can include user's job rank, user's department of employment, user's time of employment within the department, and so forth. It will be appreciated that the registrar 104 can also prompt the portal generator 102 to generate a new portal in response to information inputted by the user. In some embodiments, the registrar 104 can review the permissions allocated to this user and/or group prior to deciding to which portal to assign the user, as discussed in greater detail below.

The system 100 can include a database interface 106 that is configured to communicate with one or more databases 120 (e.g., database 121; database 122; database 123; database 124) of each department within the municipality. In illustrative embodiments, one or more of the databases 120 is a secure database, each secure database belonging to a different department within the municipality.

The databases of the municipality can store information about employees, contacts, upcoming projects and events, records, and other information from each department that is part to the municipality. The database interface 106 can have access to each of these databases such that information can be centralized within the system 100 to allow members of each channel to view and/or edit information that is relevant to their field of work within the channel. The database interface 106 can be customized to allow reading of specific information from each database, with machine learning capabilities to determine which information is to be shared with members of the channel based on the event that occurs. A database manager 108 can be used to selectively control access to the databases of the plurality of municipal groups for each of the portals. Access to a given portal can be a function of the requesting member or group, with access being given to a portion and/or an entirety of the database.

The communication platform 100 has a user interface server 110 configured to provide a user interface through which the user may communicate with the communication platform 100. The user may access the user interface via an electronic device (such as a computer, smartphone, etc.), and use the electronic device to make user inputs, such as creating a portal using the portal generator 102. In some embodiments, the electronic device may be a networked device, such as an internet-connected smartphone or desktop computer. The user input may include clicking on "Create a Channel" to create portals, or other elements of the dashboard to pull up map views and other features, as discussed in greater detail below. The user interface 110 can provide the members with the ability to view database contents collected by the database manager, After the information from the database is accessed, the information can be passed to the display manager 112, which coordinates with the user interface server 110 to display the information on a display for the user. For example, the display manager 112 can display database information at predetermined locations on the user interface to allow members to interact with the data. The display manager 112 can include predetermined rules for displaying the information, though, in some embodiments, the members can customize individual displays to instruct the display manager 112 where to display certain information and/or whether to omit or highlight certain types of information. For example, in some embodiments, members can customize the display manager settings to flash warnings in a given location of the display about the occurrence of emergency events such as fires, shooting, floods, and so forth, to ensure that members do not overlook the occurrence of such an event and respond immediately. Alternatively, or in addition, the display manager 112 can display different groups of information in various orders or chronologies, such as by time, by task, by group, by responsible party, e.g., department, and so forth.

The system 100 can allow for interfacing and/or integrating a plurality of databases contained on a plurality of computer aided dispatch systems with one another. For example, the channel can be created to access each database such that various departments of the channel can access, view, and/or search database contents of other departments within the channel. In some embodiments, the databases of a plurality of different agencies in the municipality can be shared such that, for example, various police agencies can search the contents of other police agencies within the channel to allow data sharing regarding suspects, arrests, warrants, suspicious packages, bomb threats within the area, and so forth.

The channel can create a means for members to share their data. For example, after the administrator sets up data permissions for the organization, one or more members in the department can create a channel that is in-line with these granted permissions. It will be appreciated that once the channel is created, the system can add data and additional organizations to the channel in accordance with the organizational data sharing settings set up by the administrator substantially automatically, e.g., without signing of a user agreement. In some embodiments, the members can further modify permissions of data shared within the channel with members with varying levels of granularity.

The communication platform 100 can include a machine learning module 113. As more data enters the system, the machine learning module 113 can learn which data is most relevant for each member and/or group based on user member interaction with data and with user feedback. The machine learning module 113 can include one or more storage receptacles 115 therein for remembering behaviors, system settings, and so forth. Each storage receptacle 115 can include a temporal receptive field 114 for storing behaviors associated with similar tasks over a period of time, and an analysis field 116 for computing inefficiencies and optimizing processes.

The machine learning module 113 can evaluate events that occur within the system 100 and create checklists or workflows for similar events occurring in the future. For example, in the case of a bomb threat, the system can register past occurrences of bomb threats being addressed in the municipality, and create a workflow of events, e.g., a task list, that can be performed to alleviate the situation, such as, alerting the proper authorities, evacuating the area, calling in bomb diffusion specialists, disarming the device, searching the area for evidence of the perpetrator, and so forth. In some embodiments, the system can include a task manager to assign tasks to various agencies based on their specialties or from past events in which the agency handled a particular task. This workflow can be shared between police and other relevant agencies within the municipality by sending information to the display manager 112 for display on the dashboards for each department.

In illustrative embodiments, the communication platform 100 can include a task manager 118. The task manager 118 can allow for one or more tasks to be assigned to one or more members of a channel. For example, after one or more tasks are prepared, the task manager can delegate the tasks according to rules and/or permissions of the channel or the members. The task manager 118 can work in conjunction with the machine learning module 113 to optimize tasks and/or communicate with the member via notifications and/or the display manager to provide updates about tasks and other events.

The task manager can, in some embodiments, provide live tracking and real-time updates that can keep the relevant departments apprised of the latest details of the situation at all times. Over time, as more and more instances of the event occur, the AI can optimize the process by which departments collaborate to address the issue by learning from past efficiencies and inefficiencies to ensure that future events are addressed with precision, accuracy, and time savings.

In some embodiments, the task management can be performed by a third-party collaboration software that manages tasks and assignments of tasks to various agencies. The system can make task suggestions based on the issue at hand and manage assignment of tasks to various departments.

Each of the above-described components is operatively connected by any conventional interconnect mechanism. FIG. 1 simply shows a bus communicating each the components. Those skilled in the art should understand that this generalized representation can be modified to include other conventional direct or indirect connections. Accordingly, discussion of a bus is not intended to limit various embodiments.

Indeed, it should be noted that FIG. 1 only schematically shows each of these components. Those skilled in the art should understand that each of these components can be implemented in a variety of conventional manners, such as by using hardware, software, or a combination of hardware and software, across one or more other functional components. For example, the machine learning module 113 may be implemented using a plurality of microprocessors executing firmware. As another example, the components discussed above may be implemented using one or more application specific integrated circuits (i.e., "ASICs") and related software, or a combination of ASICs, discrete electronic components (e.g., transistors), and microprocessors. Accordingly, the representation of the components in a single box of FIG. 2 is for simplicity purposes only. In fact, in some embodiments, the machine learning module 113 of FIG. 1 is distributed across a plurality of different machines—not necessarily within the same housing or chassis.

It should be reiterated that the representation of FIG. 1 is a significantly simplified representation of an actual collaboration software system. Those skilled in the art should understand that such a device has many other physical and functional components, such as central processing units, other packet processing modules, and short-term memory. Accordingly, this discussion is in no way intended to suggest that FIG. 1 represents all of the elements of the collaboration software system.

Figure 2A:
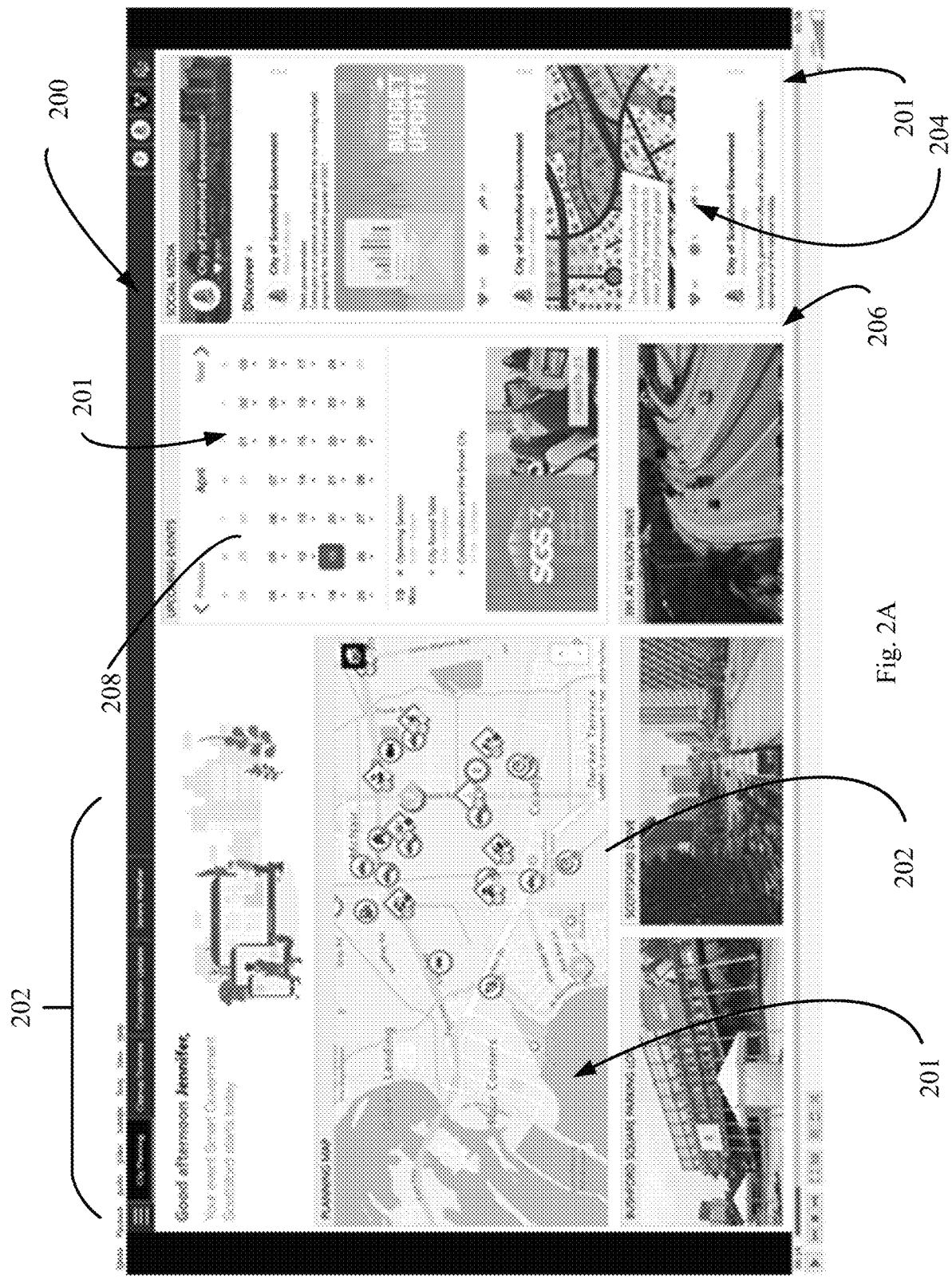
FIG. 2A illustrates an exemplary embodiment of a dashboard of the system of FIG. 1.

FIG. 2A illustrates an exemplary embodiment of a dashboard 200 that is set up by the display manager 112 on the display, showing a user interface of the communication platform of the present disclosure. As shown, a homepage of the dashboard 200 can include one or more widgets 201 that are pertinent to a user of the communication platform 100. As shown, the widgets 201 can include a planning map 202 and live feeds 204 of upcoming events in the area, real-time updates of city streets and areas of interest 206, and a calendar of events 208 for the municipality. A person skilled in the art will recognize that the dashboard 200 can be customized such that one or more of these widgets 201 can be removed and/or substituted for additional widgets of a different type, or the dashboard 200 can be updated with a different subset of information.

Figure 2B:
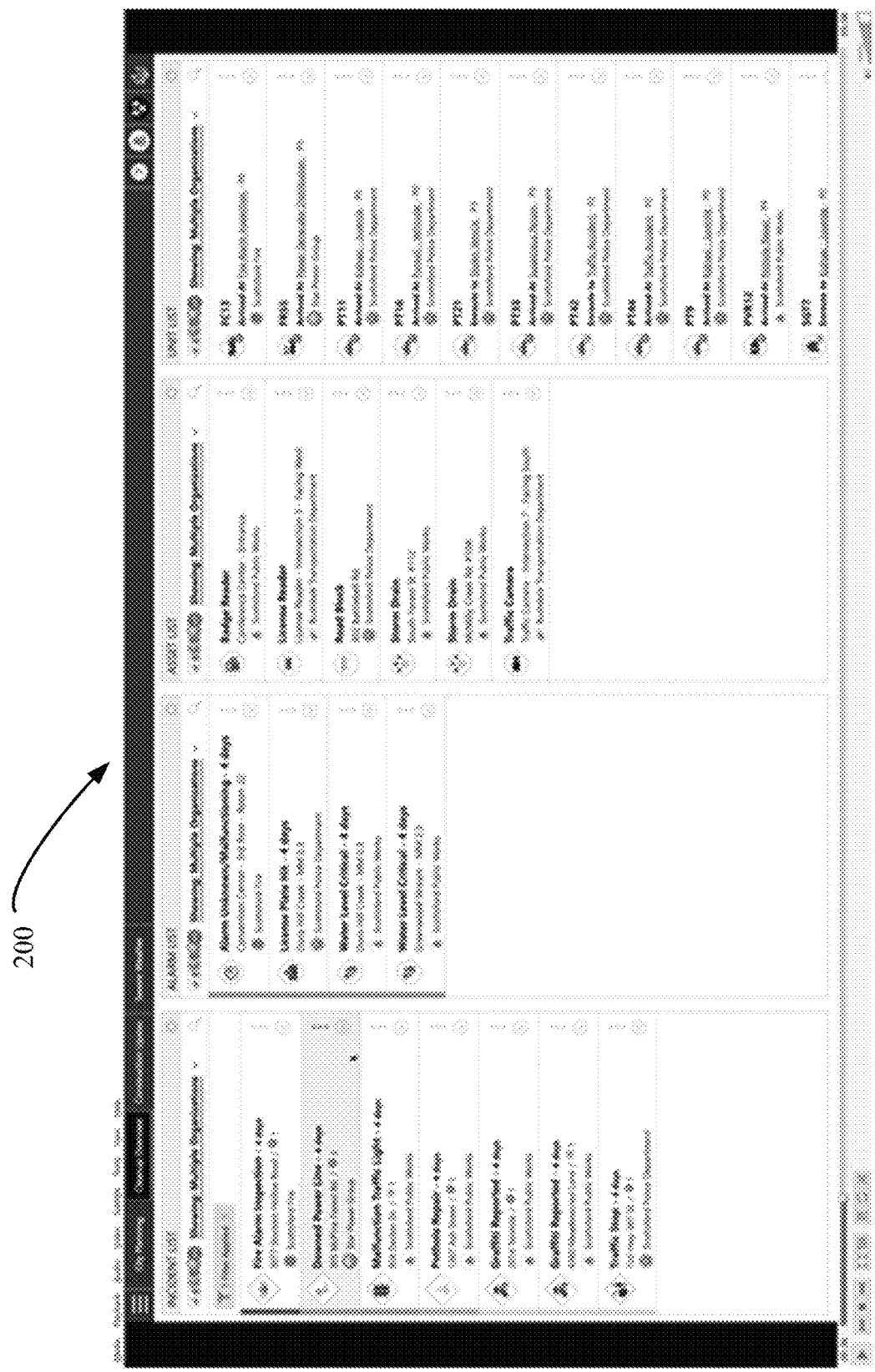
FIG. 2B illustrates a summary and status of the tasks that pertain to an event on the dashboard of FIG. 2A.

The dashboard 200 can include one or more tabs 212 for various events that require action in the municipality. For example, when accessing one or more tabs, a summary and status of the tasks that pertain to each event appear on the display, as shown in FIG. 2B. For example, under the "City Planning" tab, which can include plans for a summit within the city, a summary of incidents, alarms, assets, and units that should be deployed are listed, with tasks that need to be completed prior to the summit. This list can be filtered and/or personalized based on the user, with an administrator, e.g., a city council member, being able to track the individual tasks to ensure timely completion. While the present disclosure is discussed with respect to an implementation of the present system in a municipality, a person skilled in the art will recognize that the system can be used on a federal government, local government, community board, or international level, such as planning in conjunction with global organizations, such as the United Nations (UN) or the World Health Organization (WHO).

Figure 3:
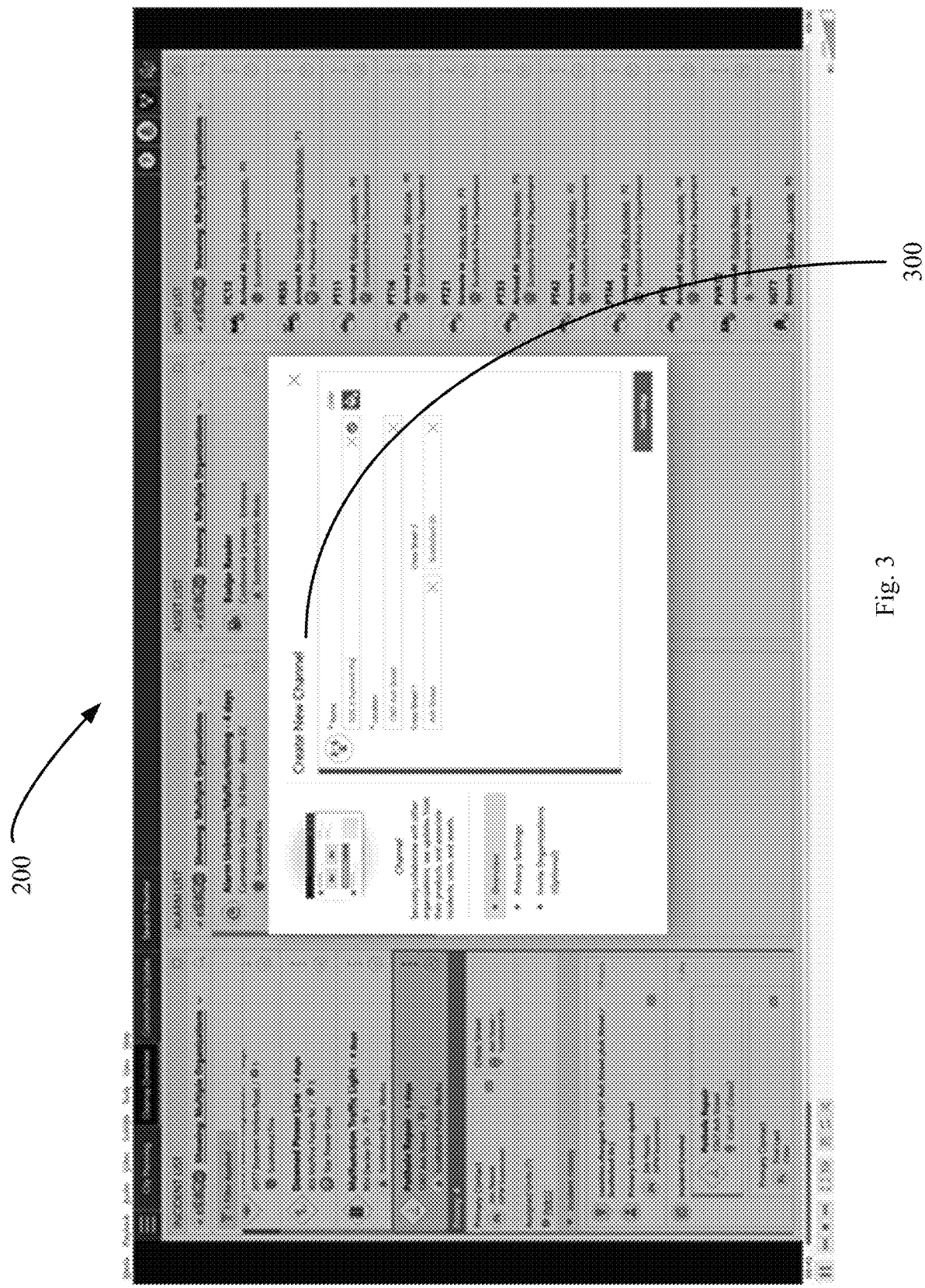
FIG. 3 illustrates the creation of a new channel in the system of FIG. 1.

FIG. 3 illustrates an exemplary embodiment of a portal or channel 300 being setup for collaboration on the planning of pothole repair in preparation for the summit that is within the scope of the present disclosure. The channel 300 can include a group created for a specific event or type of events for which data is desired to be tracked and/or shared. The channel 300 can be generated by the portal generator 102, as described above, with the portal generator 102 being configured to create one or more channels by clicking the "Create New Channel" button on the dashboard 200, as shown. To create the channel 300, a name, location and cross streets can be assigned to the task, with an option color chosen for tracking of the channel, though a person skilled in the art will recognize that the fields for creating the channel can differ based on user preferences. While the channel in FIG. 3 is being shown as created with respect to pothole repair, it will be appreciated that channels can be created for the downed power line or the malfunctioning traffic light shown in the "Incident List" section on the dashboard 200. In some embodiments, the malfunctioning traffic light and the downed power line, as shown in FIG. 3, can be combined in a single channel, as the municipality departments that fix these incidents can overlap in their duties.

The users in the channel 300, or members, can be added during formation of the channel and/or throughout the existence of the channel to promote collaboration between members. The members in each channel can include users from various departments in the municipality, such as police officers, paramedics, utility workers, traffic controllers, and so forth.

Each user can create a channel, though in some embodiments, only users with administrative permissions can create channels. The channel can be created based on a geography, an event, or an incident, among other things. To create a channel, the user can name the channel, select users to be included in the channel, and set permissions for each user within the channel based on the department to which they belong or on a more granular, user-based level. After a channel is created, users can request membership into the channel, where they can be given instant access, approved by a registrar or a system administrator, and/or approved by other members that are given authority to review membership. The registrar can assign access to an existing channel, as well as regulate member permissions for data sharing and collaboration within said channels. In some embodiments, the system can include machine learning models and other artificial intelligence (AI) algorithms that will determine channels of which a user becomes a member automatically. For example, the system 100 can use information about the user, such as the department to which the user belongs, the age of the user, the rank of the user within his or her department, and so forth to determine to which channels the user will gain membership.

Figure 4:
FIG. 4 illustrates an exemplary embodiment of a channel for planning an event within the municipality in accordance with illustrative embodiments of the present disclosure.

The channel provides a place for collaboration for departments and/or organizations that are involved in a planned event, such as the summit that is set to occur in a designated area, as discussed in FIG. 3. After it is created, as shown in FIG. 4, organizations can go through a setup process through which data filters are setup to permit selected access to data. This data can be entered through keywords, tasks, and locations of relevance to the organization, among others. After a user opens the channel 300, the system 100 continues to add pertinent data and organizations as updates are added. New data that is entered after the channel is created can be logged and stored in accordance with rules and/or permissions that were set up during channel creation. The channel can allow users to manually associate incidents, units, devices, assets, and alarms to a channel, though in some embodiments, such associations can occur automatically.

Permissions can dictate data sharing rules to allow administrators to invite users to become members of a channel but regulate the type of data they receive. Regulation of data displayed in each channel can be set at a granular level. For example, the user interface can be customized by one or more sets of permissions that enable each department of the municipality to receive information that is deemed to be relevant to that department. In such a way, for example, traffic control is not inundated with 911 calls for fires, and the fire department does not receive calls with for broken traffic lights or power outages. By way of further example, in the event of a car accident at a busy intersection, the police department, hospitals, paramedics, and traffic controllers can receive an alert of the location and time of the accident, while utility company employees are not given permission to view this information as it is likely not relevant to their day-to-day operations.

In some embodiments, the permissions can be set at a departmental level, e.g., such that members of a police department can be given viewing, sharing, or editing permissions over crime events that occur in the municipality, while utility companies are only given viewing permissions over such content, or no access to such content at all. In some embodiments, permissions can be set at a user level such that the police chief can have broad access to crime data in the municipality, while junior officers and precinct personnel are limited in their access to such information.

The channel can also receive any new updates, such as unit updates or new alarms. For example, as shown in FIG. 4, workers and/or other personnel can upload photos to the channel to show areas that need repair as well as status updates on repairs within the channel. As shown, photos of workers cleaning graffiti on city streets can be uploaded with their locations tagged to identify areas that have been repaired. An administrator can manually check off the task of cleaning the graffiti once completed, though, in some embodiments, the machine learning module 113 can automatically update the task list to reflect task completion.

In some embodiments, the channel 300 can be created based on a shape of a designated area drawn on the map 202 within the dashboard 200. The designated area can circumscribe a portion of the map to create a channel automatically that includes the designated area, with events that are occurring within the designated area within a specific timeframe being added to the channel for members based on their permission settings.

In some embodiments, channels can be configured to send alerts to the members of the channel. For example, after a post or another update is made in a channel, a notification can be sent to the members of the channel to alert them of the occurrence of the post. Some non-limiting examples of the post can include a new photo, a traffic update, a maintenance request, and so forth. The notification can be made in the form of a phone signal, a phone call, an auditory alarm, a ping notification, and/or another means of alert known to one skilled in the art. It will be appreciated that one or more channels can be alerted simultaneously, and the alert can be sent to all the members within those channels, or a subset of the members in accordance with the permissions of the members within those channels. In some embodiments, members can customize and/or silence the alerts as well as choose in what form they wish to receive specific alerts. Moreover, in some embodiments, the alert can actively reach out to various departments of the municipality that are within the corresponding channel. For example, in the event of a fire, the system can alert the fire department, the police department, and/or the transportation department to divert traffic from the area, among others.

Figure 5:
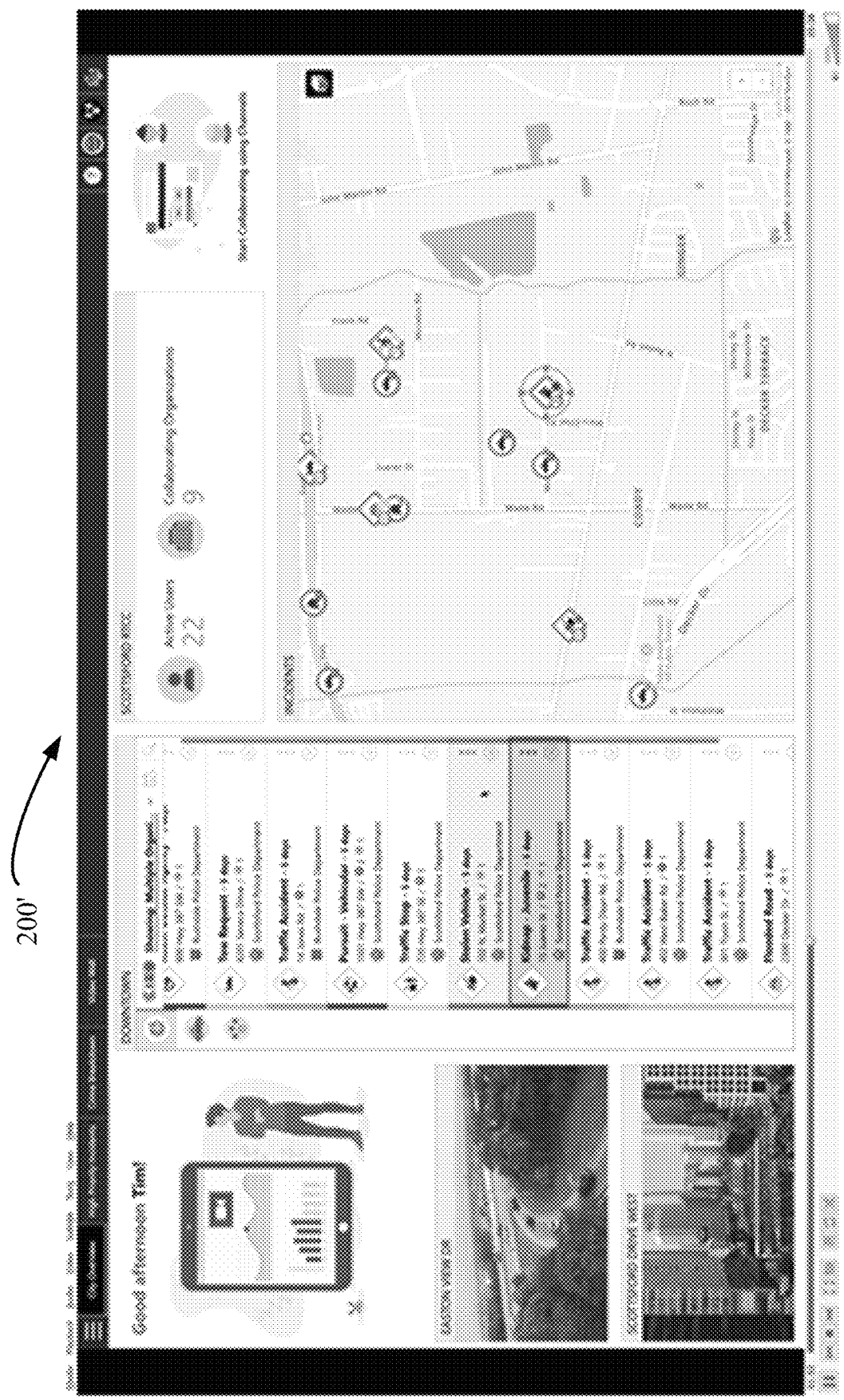
FIG. 5 illustrates an exemplary embodiment of a channel for an emergency within the municipality in accordance with illustrative embodiments of the present disclosure.
Figure 6:
FIG. 6 illustrates an exemplary embodiment of the dashboard having a plurality of camera angles to track the emergency of FIG. 5.

FIG. 5 illustrates another exemplary embodiment of the presently disclosed system used for responding in an unplanned emergency. For example, as shown, the dashboard 200' of a crime center can be oriented to include camera views of intersections of importance, a list of incidents in the area, and a map showing the location of each incident. The incidents can be color coded such that the crime center can identify high priority incidents as well as more recent accidents. The system 100 can allow for collaboration in high priority incidents by providing relevant data to a plurality of departments in a large region, e.g., multiple police precincts. For example, police pursuits and kidnappings, as shown in red, can highlight high profile incidents occurring in real time. In such cases, police precincts in areas towards which the perpetrator is heading can become aware of his coordinates and seek to cut off exits. In addition, highway patrol, hospitals, and mass alerting systems in conjunction with traffic cameras and CCTV can be used to track the perpetrator as well as alert drivers of a high risk situation, not only in the present location but in the direction in which the perpetrator is heading. The system 100 can bring together updates from different systems of record, such as CAD events from dispatch systems, third party dispatch systems, and mass alerting systems to ensure traffic in the area is cleared, the authorities are notified, and casualties are minimized. Moreover, the system 100 can bring together video walls from multiple sources. For example, in kidnapping or police pursuit events, as shown in FIG. 6, the system can be configured to trigger camera views on the dashboard of members of the channel to tune to the last known location of such incidents. The cameras can then be used to track the vehicle throughout its pursuit, as well as to obtain information about instant updates of the location of the perpetrators in real-time. By linking the CAD incident, police units, the fire department, traffic controllers, and CCTV cameras together in the channel, all organizations involved are able to respond in a timelier fashion.

Currently, organizations that have access to data from different systems are not able to integrate them such that they can observe similarities. Associations would be a time-consuming manual process which means some connections, such as obtaining real-time tracking of the fleeing vehicle would not occur. The present disclosure allows multiple industries to be integrated in a given channel, so bringing in data from different industry verticals will help break down data silos, helping cities address issues faster. In the traffic example, traffic cameras as well as security cameras, dashboard cameras, and even satellites can be integrated in a single channel to work together to track the location of the vehicle in real-time. Another example of bringing in data from different industry verticals can be observed in the event that a series of water pressure alarms occur along a street. Taken individually, each alarm might be considered of low importance, but the occurrence of multiple alarms being activated can suggest a major issue is imminent, e.g., a water main break. The ability to observe the alarms in conjunction allows city planners to prioritize its activities to perform preventive maintenance. Moreover, members of each channel would be able to track whether the issue has been reported and whether the relevant repair services, e.g., the utility company, has been contacted to address the issue.

Figure 7:
FIG. 7 illustrates an exemplary embodiment of the user interface for changing permission settings for the system of FIG. 1.

As discussed above, other departments can be added to the channel, with data sharing rules set up to regulated selected access to data. FIG. 7 illustrates an exemplary embodiment of the data sharing rules for the channel created by the crime center to resolve the kidnapping event. As shown, the crime center can collaborate with such organizations such as the hospital, the traffic department, public works, highway patrol, and police agencies, while selectively filtering data and specifying with which members the data is shared. Using these data sharing rules, can allow other the crime center to invite other organizations to the channel for collaboration and data sharing, while specifying the type of data being shared. Moreover, the data can be integrated onto a common map such that devices from other organizations, such as license plate readers, can facilitate cross-agency collaboration and provide a consolidated view from disparate systems.

Figure 8:
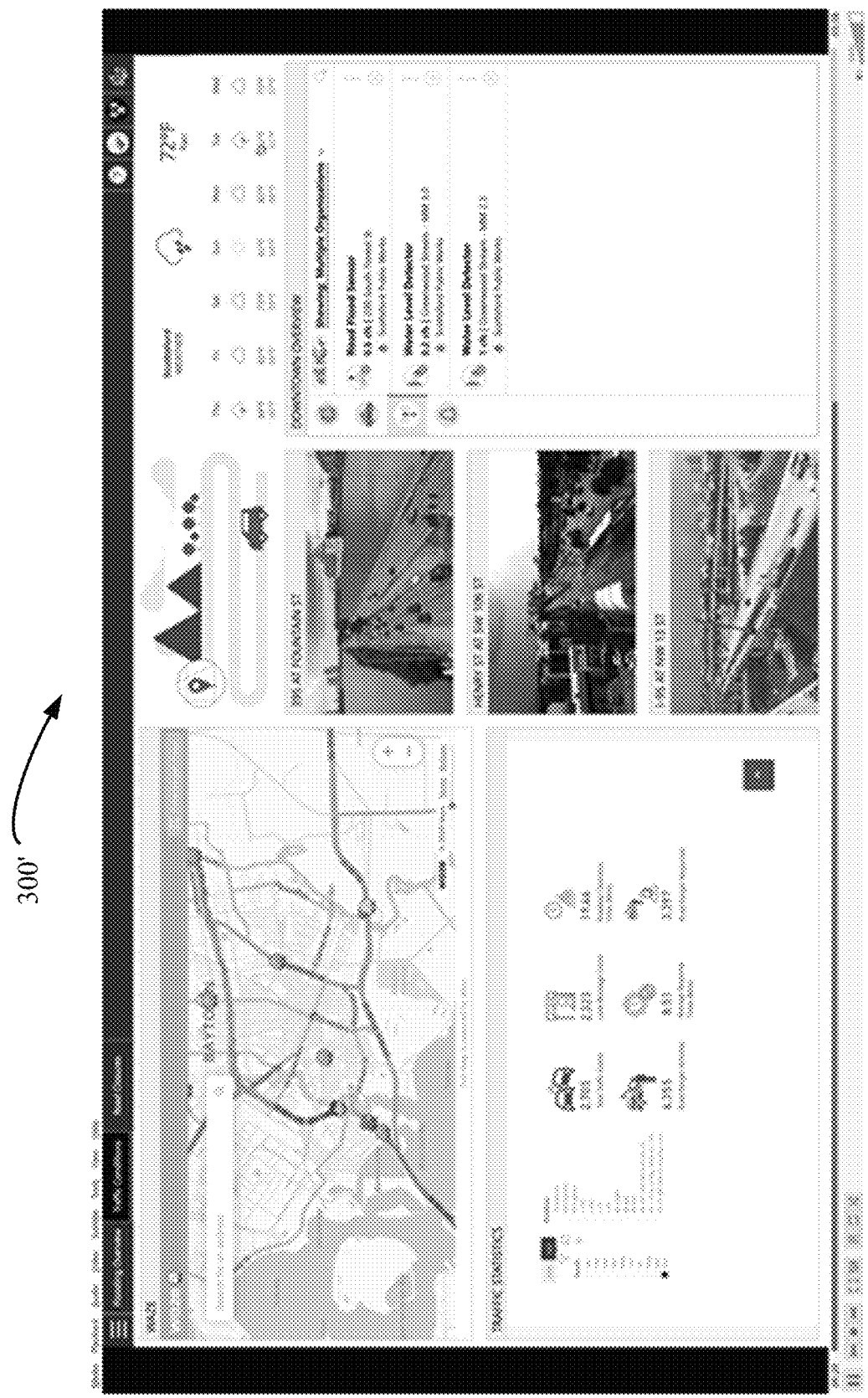
FIG. 8 illustrates an exemplary embodiment of a channel for handling a weather event within the municipality in accordance with illustrative embodiments of the present disclosure.

FIG. 8 illustrates another embodiment of a channel 300" being used in a case of extreme weather in the municipality. Weather alerts and flooding sensors can be monitored using the channel, with utility companies and sewer drainage specialists monitoring the channel for flooding and other dangerous weather conditions. Public safety can be brought in to collaborate with these departments in the event evacuation of residents is needed. The channel 300" can include real time weather monitoring as well as integration between traffic cameras and reports of rising flood levels to allow channel members to view weather situations in real-time. As shown, the channel 300" can integrate with real-time mapping applications such as Waze, Google Maps, or another mapping software to monitor traffic patterns and identify weather conditions throughout the municipality, while keeping apprised of water level sensor readings. Rather than contacting the traffic department and the Department of Water and Sewers independently for such information, the channel 300" can provide centralized, real-time, automatic updates from CAD systems, video management systems, and sensors throughout the city, which allows all members to have access to the information through the channel 300. Each member can also upload and/or post their individual images, videos, and updates to inform members about the status of specific locations within the municipality.

Figure 9:
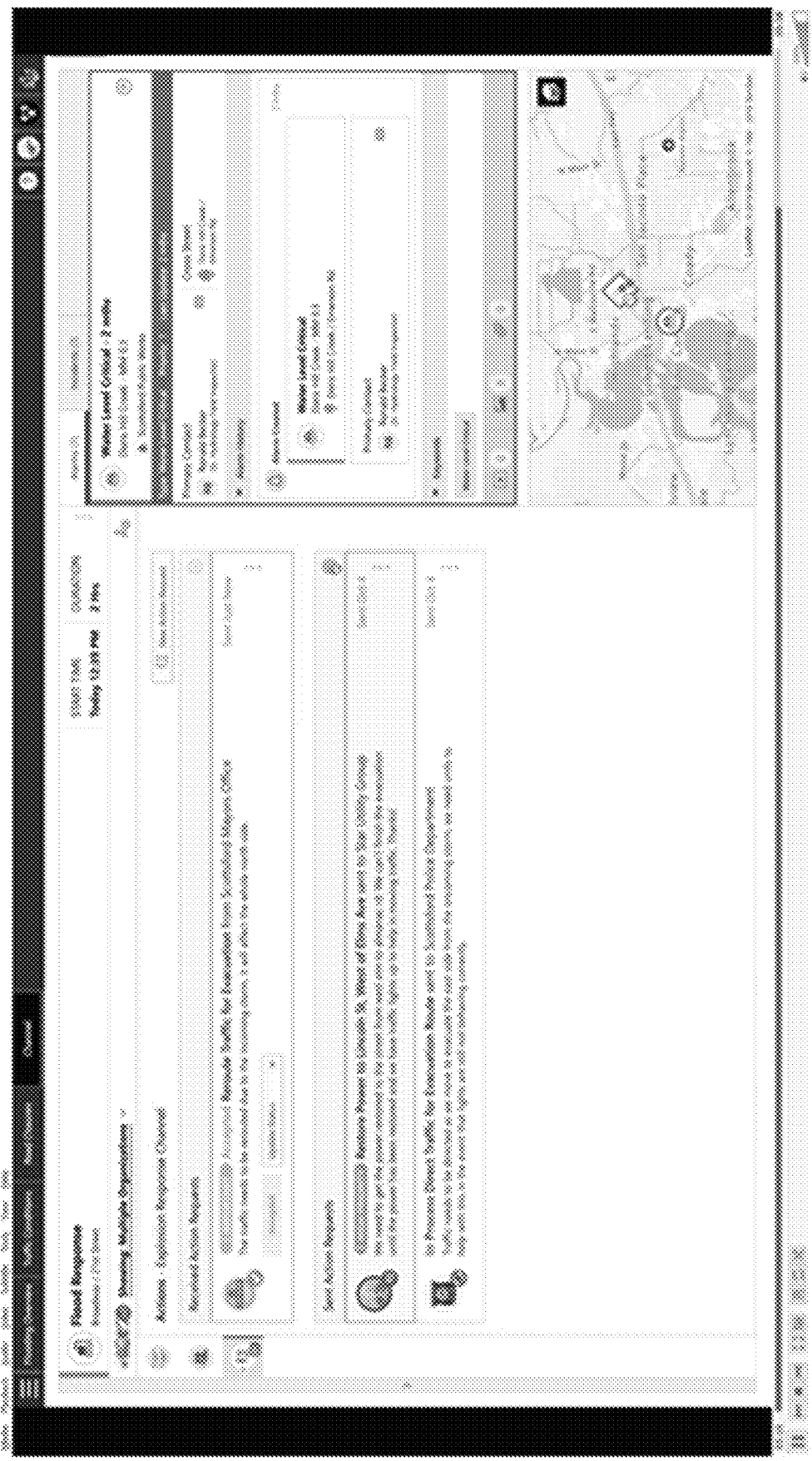
FIG. 9 illustrates an exemplary embodiment of the user interface for assigning tasks in accordance in accordance with illustrative embodiments of the present disclosure.

In some embodiments, actions or tasks can be assigned to departments. FIG. 9 shows an exemplary embodiment of tasks being assigned within a channel. For example, with respect to the severe weather example discussed with respect to FIG. 8 above, the channel 300" can assign an action to the utility company to restore power and police to direct traffic, among others. The utility company can then, in turn, coordinate with local governments, public safety, and the Department of Transportation to receive updates. As a result, organizations are sharing secure data with one another while not having direct access to each other's networks, thereby eliminating inefficiencies when addressing and preparing for planned events as well as emergency situations.

Figure 10:
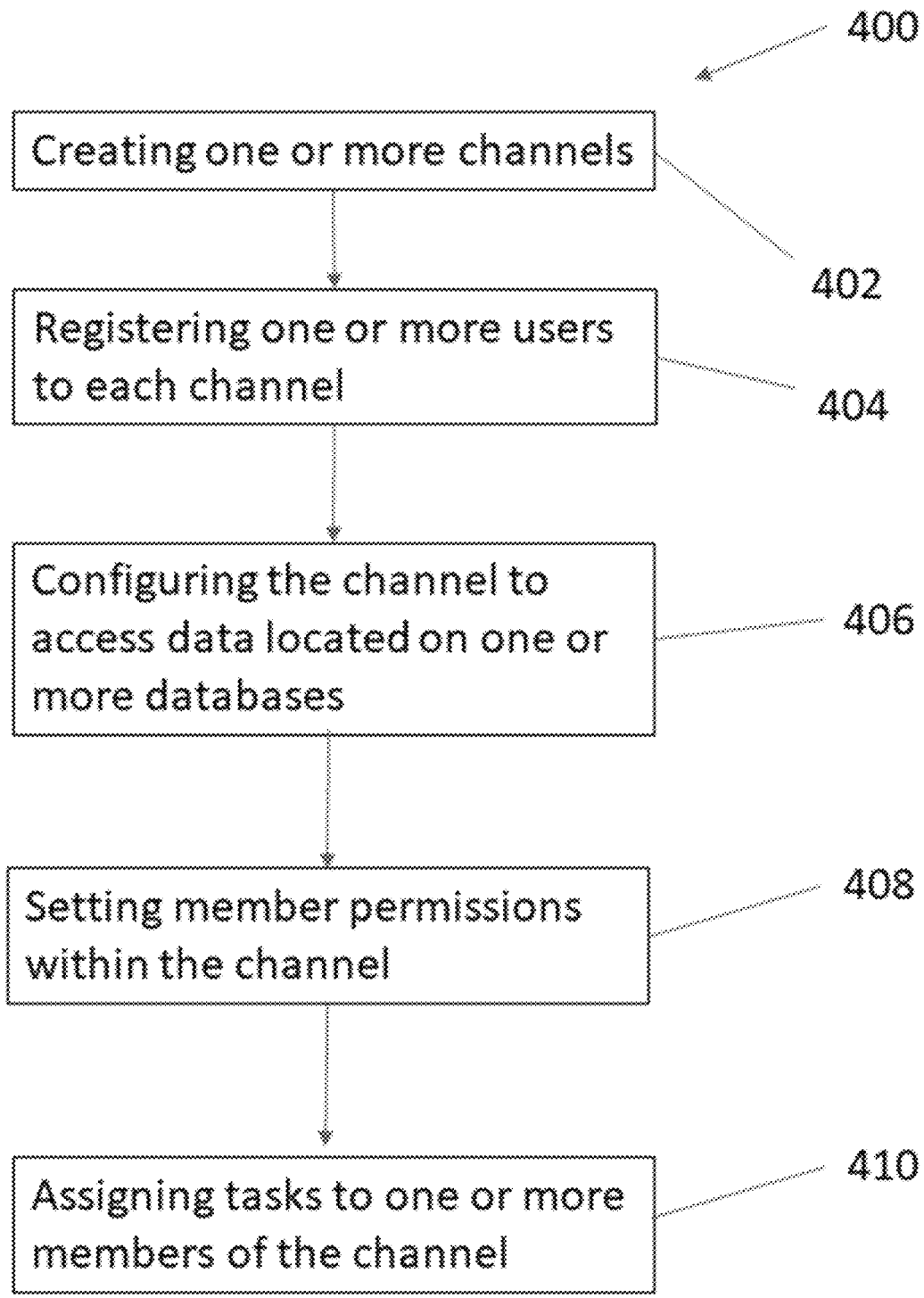
FIG. 10 illustrates an exemplary embodiment of a method for creating portals and registering users to portals within the system in accordance with illustrative embodiments of the present disclosure.

FIG. 10 illustrates an exemplary process 400 for creating one or more channels using the system 100 for collaboration between organizations. Except as indicated below and will be readily appreciated by one having ordinary skill in the art, the steps of the described process can be performed in various sequences, and one or more steps can be omitted or added. In addition, some of the steps may be performed in a different order than that shown, or at the same time. Those skilled in the art therefore can modify the process as appropriate. It should be noted that this process is substantially simplified from a longer process that normally would be used to form the portals. Accordingly, the process of forming the portals has many steps.

The process 400 can begin at step 402 by using the portal generator 102 to create one or more channels. The channels can be set up to manage and/or track events, with the channels enabling secure collaboration with other organizations, observation of updates from their products, and associate incidents, units and assets.

After a channel is created, users can register to the channel (step 404) via the registrar 104 to become members. Membership can be assigned (or "granted") based on user's job, user's rank, or user preferences, or to departments and/or groups, with membership being granted either manually or automatically.

After membership is granted, the channel can communicate with the database manager 108 via the database interface 106 to access data located on one or more databases of the member groups (step 406). Incidents, units, devices, assets, and alarms stored in the data can be associated to one or more of the channels. The channel can share the data from the databases within the channel to allow the members to interact with the data.

Data is disclosed to members in accordance with permissions that are set within the channel (step 408). Permissions can be set in accordance with the department to which the member belongs to ensure that relevant incidents and tasks are visible to each member.

In some embodiments, the task manager 118 can assign tasks to individual members of the channel to be addressed (step 410). Assignment of tasks can occur manually or automatically, with other members tracking the progress of the tasks within the channel in real-time.

A Summary of Some Embodiments

Without limiting the scope of the foregoing disclosure, the following text is a summary of some embodiments.

The present disclosure generally relates to a computer communication system that promotes collaboration between organizations by enabling secure sharing of information updates from their systems of record without having direct access to each other's networks. For example, collaboration can be implemented between departments in a municipality for forming a cross-agency connection and data sharing for coordinating actions for bridging gaps in organizations and across regions. The system can facilitate creation of channels or portals for forming groups for monitoring and completion of governance tasks between disparate organizations. Users can join these channels to monitor, track, or address issues in accordance with permissions and relevance to their areas of expertise. Real-time updates can be provided by way of photos, videos, and messaging within each channel to facilitate coordinated actions to address each situation. Illustrative embodiments are implemented as a system, method, and/or communication platform product having a computer usable medium with computer readable program code thereon. The computer readable code may be read and utilized by a computer system in accordance with conventional processes.

In accordance with one embodiment, a computer communication platform includes a portal generator configured to generate a plurality of separate portals, each portal being accessible by a plurality of municipal groups having computer aided dispatch systems, a registrar configured to register municipal groups to one or more the plurality of portals, the registrar configured to assign access to at least one of the portals as a function of information relating to a registering municipal group, the registrar also configured to cause the portal generator to generate a new portal in response to the information, and a database interface configured to communicate with secured databases for the plurality of municipal groups, each municipal group having a database that has different information from the information in at least one of the other databases of another municipal group. The platform further includes a database manager configured to selectively control access to the databases of the plurality of municipal groups for each of the portals, the selected access for a given portal being a function of the requesting municipal group and/or a specific requester, the selected access being for less than the entirety of the requested database, a display manager configured to display selected information retrieved from the secured databases and showing updates, the display being configured to display different groups of information in one of a plurality of different orders, and a task manager enabling assignment of one or more tasks to members of a given portal, the task manager communicating using the alarm and/or the display manager.

The information from each database is accessible via the plurality of separate portals, which allow for one or more of viewing, editing, searching, or updating the information within the portal. The portal is created automatically in response to an event contained within the database of one or more of the municipal groups. Among other things, a location of the selected information displayed using the display manager is set according to predetermined rules that are customized by each member. Each portal of the plurality of separate portals may be generated based on a geography, an event, or an incident.

In various embodiments, the updates shown by the display manager may be updated in real-time. In some embodiments, the plurality of different orders for displaying different groups of information includes one or more of time, task, group, or responsible party.

The database manager is further configurable to permit different database access levels to different municipal groups and/or specific requesters. The access is assigned based on one or more of a type of municipal group, a member's job rank within the registering municipal group, or a member's duration of employment within the registering municipal group.

The computer communication platform my also include a machine learning module configured to analyze the selected information to create tasks based on previous assignment of tasks to members of the given portal. In some embodiments, the alarm is configured to forward an electronic message toward at least one of the plurality of municipal groups in response to a selected event recognized by a given portal.

In accordance with another embodiment, a method of using a channel of a computer collaboration system is disclosed. The method includes registering one or more members to a channel in accessible by a plurality of municipal groups having computer aided dispatch systems, each of the one or more channels corresponding with an event, the event having one or more tasks being tracked therein, sharing data associated with the task with the one or more members, selecting a task from the one or more tasks, coordinating performance of a portion of the task between the one or more members of the channel, and updating a status of the portion of the task following performance of activities associated with the task.

The method also includes monitoring activities being performed with respect to the task. Monitoring may further include tracking the one or more members throughout their performance of the task in real-time.

In various embodiments, selected access to each channel may be granted based on a nature of the requesting municipal group and/or a specific requester, the selected access being for less than the entirety of the requested database. Among other things, coordinating performance of the task further includes bringing together updates from different systems of record into the channel, and assigning portions of the task to the one or more members of the channel. Assignment of portions of the task may occur substantially automatically.

In accordance with yet another embodiment, a computer program product for use on a computer system for collaborating between disparate organizations that includes a tangible, non-transient computer usable medium having computer readable program code thereon is disclosed. The computer readable program code includes code for generating a plurality of separate portals, each portal being accessible by a plurality of municipal groups having computer aided dispatch systems, and code for registering municipal groups to one or more the plurality of portals, the registrar configured to assign access to at least one of the portals as a function of information relating to a registering municipal group, with the registrar also configured to cause the portal generator to generate a new portal in response to the information. The computer readable program code also includes code for communicating with secured databases for the plurality of municipal groups, each municipal group having a database that has different information from the information in at least one of the other databases of another municipal group, code for selectively controlling access to the databases of the plurality of municipal groups for each of the portals, code for displaying selected information retrieved from the secured databases and showing updates, with the display being configured to display different groups of information in one of a plurality of different orders, and code for enabling assignment of one or more tasks to members of a given portal, the task manager communicating using the alarm and/or the display manager.

The computer readable program code may further include code for machine learning configured to analyze the selected information to create tasks based on previous assignment of tasks to members of the given portal. The code for selected access for a given portal may be a function of the requesting municipal group and/or a specific requester, the selected access being for less than the entirety of the requested database.

A listing of certain reference numbers is presented below.
  100: communication platform;
  102: portal generator;
  104: registrar;
  106: database interface;
  108: database manager;
  110: user interface server;
  112: display manager;
  113: machine learning module;
  115: storage receptacle;
  116: analysis field;
  118: task manager;
  120: Databases;
  121: Database;
  122: Database;
  123: Database;
  124: Database;
  200: dashboard;
  201: widget;
  202: planning map;
  204: live feed;
  206: area of interest;
  208: calendar;
  212: tab;
  300: channel (or portal);
  300": channel.

Various embodiments may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

Without limitation, potential subject matter that may be claimed (prefaced with the letter "P" so as to avoid confusion with the actual claims presented below) includes:

P1. A computer communication platform comprising:
  a portal generator configured to generate a plurality of separate portals, each portal being accessible by a plurality of municipal groups having computer aided dispatch systems;
  a registrar configured to register municipal groups to one or more the plurality of portals, the registrar configured to assign access to at least one of the portals as a function of information relating to a registering municipal group, the registrar also configured to cause the portal generator to generate a new portal in response to the information;
  a database interface configured to communicate with secured databases for the plurality of municipal groups, each municipal group having a database that has different information from the information in at least one of the other databases of another municipal group;

a database manager configured to selectively control access to the databases of the plurality of municipal groups for each of the portals, the selected access for a given portal being a function of the requesting municipal group and/or a specific requester, the selected access being for less than the entirety of the requested database;

a display manager configured to display selected information retrieved from the secured databases and showing updates, the display being configured to display different groups of information in one of a plurality of different orders; and a task manager enabling assignment of one or more tasks to members of a given portal, the task manager communicating using the alarm and/or the display manager.

P2. The platform of P1, wherein the information from each database is accessible via the plurality of separate portals, the plurality of separate portals allowing for one or more of viewing, editing, searching, or updating the information within the portal.

P3. The platform of any of P1-P2, wherein a location of the selected information displayed using the display manager is set according to predetermined rules that are customized by each member.

P4. The platform of any of P1-P3, wherein the updates shown by the display manager are updated in real-time.

P5. The platform of any of P1-P4, wherein the plurality of different orders includes one or more of time, task, group, or responsible party.

P6. The platform of any of P1-P5, wherein the database manager is further configurable to permit different database access levels to different municipal groups and/or specific requesters.

P7. The platform of P6, wherein access is assigned based on one or more of a type of municipal group, a member's job rank within the registering municipal group, or a member's duration of employment within the registering municipal group.

P8. The platform of any of P1-P7, wherein the portal is created automatically in response to an event contained within the database of one or more of the municipal groups.

P9. The platform of any of P1-P8, further comprising a machine learning module configured to analyze the selected information to create tasks based on previous assignment of tasks to members of the given portal.

P10. The platform of any of P1-P9, wherein each portal of the plurality of separate portals is generated based on a geography, an event, or an incident.

P11. The platform of any of P1-P10, wherein the alarm is configured to forward an electronic message toward at least one of the plurality of municipal groups in response to a selected event recognized by a given portal.

P12. A method of using a channel of a computer collaboration system, the method comprising:

registering one or more members to a channel in accessible by a plurality of municipal groups having computer aided dispatch systems, each of the one or more channels corresponding with an event, the event having one or more tasks being tracked therein;

sharing data associated with the task with the one or more members;

selecting a task from the one or more tasks;

coordinating performance of a portion of the task between the one or more members of the channel; and updating a status of the portion of the task following performance of activities associated with the task.

P13. The method of P12, wherein selected access to each channel is granted based on a nature of the requesting municipal group and/or a specific requester, the selected access being for less than the entirety of the requested database.

P14. The method of any of P12-P13, further comprising monitoring activities being performed with respect to the task.

P15. The method of P14, wherein monitoring further comprises tracking the one or more members throughout their performance of the task in real-time.

P16. The method of any of P12-P15, wherein coordinating performance further comprises bringing together updates from different systems of record into the channel, and assigning portions of the task to the one or more members of the channel.

P17. The method of P16, wherein assignment of portions of the task occurs substantially automatically.

P18. A computer program product for use on a computer system for collaborating between disparate organizations, the computer program product comprising a tangible, non-transient computer usable medium having computer readable program code thereon, the computer readable program code comprising:

code for generating a plurality of separate portals, each portal being accessible by a plurality of municipal groups having computer aided dispatch systems;

code for registering municipal groups to one or more the plurality of portals, the registrar configured to assign access to at least one of the portals as a function of information relating to a registering municipal group, the registrar also configured to cause the portal generator to generate a new portal in response to the information;

code for communicating with secured databases for the plurality of municipal groups, each municipal group having a database that has different information from the information in at least one of the other databases of another municipal group;

code for selectively controlling access to the databases of the plurality of municipal groups for each of the portals, code for displaying selected information retrieved from the secured databases and showing updates, the display being configured to display different groups of information in one of a plurality of different orders; and code for enabling assignment of one or more tasks to members of a given portal, the task manager communicating using the alarm and/or the display manager.

P19. The computer program product of claim 19, wherein the code for selected access for a given portal is a function of the requesting municipal group and/or a specific requester, the selected access being for less than the entirety of the requested database.

P20. The computer program product of any of P18-P19, further comprising code for machine learning configured to analyze the selected information to create tasks based on previous assignment of tasks to members of the given portal.

P31. A computer-based communication platform comprising:

a portal generator configured to generate a plurality of separate portals, each portal being accessible by a plurality of municipal groups, each municipal group of the plurality of municipal groups having:

(i) a corresponding computer aided dispatch system; and (ii) a corresponding secured database, the corresponding secured database accessible to the municipal group, but not directly accessible by other municipal groups of the plurality of municipal groups, the corresponding secured database having different information from the information held in at least one of the other secured database of another municipal group of the plurality of municipal groups;

a registrar configured to:

(a) register, to the platform, each municipal group of the plurality of municipal groups, each such municipal group being a registered municipal group; and to (b) assign, for each registered municipal group, access to at least one of the portals as a function of information relating to registering said registered municipal group, each such registered member being a registered member of its corresponding assigned portal;

a database interface configured to communicate with the secured databases corresponding to the plurality of municipal groups;

a database manager configured to selectively grant access to a secured database of the plurality of municipal groups for each of the portals, said database being a requested database, said access being granted access for a given portal being a function of the registered municipal group requesting access and/or a specific requester, the granted access being for less than the entirety of the requested database; and a display manager configured to display selected information retrieved from the secured databases and showing updates, the display being configured to display different groups of information in one of a plurality of different orders.

P32. The platform of P1, wherein, the registrar is further configured to (c) cause the portal generator to generate a new portal in response to the information relating to registering said registered municipal group.

P33. The platform of any of P31-P32, further comprising a task manager configured to assign one or more tasks to registered members of a given portal, the task manager communicating using an alarm and/or the display manager.

P34. The platform of any of P31-P33, wherein the information from each database is accessible via the plurality of separate portals, the plurality of separate portals allowing for one or more of viewing, editing, searching, or updating the information within the portal.

P35. The platform of any of P31-P34, wherein a location of the selected information displayed using the display manager is set according to predetermined rules that are customized by each requesting member.

P36. The platform of any of P31-P35, wherein the updates shown by the display manager are updated in real-time.

P37. The platform of any of P31-P36, wherein the plurality of different orders includes one or more of time, task, group, or responsible party.

P38. The platform of any of P31-P37, wherein the database manager is further configurable to permit different database access levels to different municipal groups and/or specific requesters.

P39. The platform of P38, wherein access is assigned based on one or more of a type of municipal group, a member's job rank within the registering municipal group, or a member's duration of employment within the registering municipal group.

P40. The platform of any of P31-P39, wherein the platform is configured to create at least one portal of the plurality of portals automatically in response to an event contained within the database of one or more of the municipal groups.

P41. The platform of any of P31-P40, further comprising a machine learning module configured to analyze the selected information to create tasks based on previous assignment of tasks to members of the given portal.

P42. The platform of any of P31-P41, wherein each portal of the plurality of separate portals is generated based on at least one of a geography, an event, or an incident.

P43. The platform of any of P31-P42, wherein an alarm is configured to send an electronic message to at least one of the plurality of registered municipal groups in response to a selected event recognized by a given portal.

P61: A method of controlling access by a set of requesting entities to data in a secure database of a first party, the method comprising:

providing, to the requesting entity, access to a portal, the portal in data communication with the secure database;

providing, to the requesting entity via the portal, controlled access to data in the secure database, said controlled access limited by a set of controls.

P62: The method of P61, wherein the set of controls comprises:

(a) limiting access to such data by requiring that each requesting entity of the set of requesting entities desiring to access the data be registered to a system providing the portal.

P63: The method of any of P61-P62, wherein the set of controls comprises:

(b) limiting access to said data by requiring that each requesting entity of the set of requesting entities desiring to access the data be assigned to the portal.

P64: The method of any of P61-P63, wherein the set of controls comprises:

(c) limiting access to such data by defining a limited set of data from the secure database that the requesting entity may access.

P65: The method of P64 wherein defining a limited set of data from the secure database that the requesting entity may access comprises customizing a database interface to allow reading of specific information from the secure database.

P66: The method of P64 wherein defining a limited set of data from the secure database that the requesting entity may access comprises customizing a database interface to allow reading of specific information from the secure database pursuant data sharing rules that allow administrators to regulate the type of data a requesting entity may access.

P67: The method of any of P61-P66, wherein the set of controls comprises:

(d) limiting access by a requesting member to such data as a function of the requesting member or group, with access being given to a portion of the secure database, the portion being less than an entirety of the database.

P68: The method of any of P61-P66, wherein the set of controls comprises:

(d) limiting access by a requesting member to such data as a function of the requesting member or group, with access being given to a portion an entirety of the secure database.

P69: The method of any of P61-P68, wherein the set of controls comprises:

(e) limiting access by a requesting member to said data pursuant to predetermined rules that are customized by each member of the portal.

P80: A computer communication platform comprising a computer system configured to access code, the code configured to cause the computer system to implement a method according to any of P51-P69.

P90: A computer program product for use on a computer system for collaborating between disparate organizations, the computer program product comprising a tangible, non-transient computer usable medium having computer readable program code thereon, the computer readable program code including code that, when executed by the computer system, causes the computer system to implement a method according to any of P51-P69.

Various embodiments of this disclosure may be implemented at least in part in any conventional computer programming language. For example, some embodiments may be implemented in a procedural programming language (e.g., "C"), or in an object-oriented programming language (e.g., "C++"), or in Python, R, Java, LISP, or Prolog. Other embodiments of this disclosure may be implemented as preprogrammed hardware elements (e.g., application specific integrated circuits, FPGAs, and digital signal processors), or other related components.

A person skilled in the art will recognize that a "computer process" is the performance of a described function in a computer using computer hardware (such as a processor, field-programmable gate array or other electronic combinatorial logic, or similar device), which may be operating under control of software or firmware or a combination of any of these or operating outside control of any of the foregoing. All or part of the described function may be performed by active or passive electronic components, such as transistors or resistors. In using the term "computer process" within the present disclosure, a schedulable entity is not necessarily required, nor is operation of a computer program or a part thereof, although, in some embodiments, a computer process may be implemented by such a schedulable entity, or operation of a computer program or a part thereof. Furthermore, unless the context otherwise requires, a "process" may be implemented using more than one processor or more than one (single- or multi-processor) computer.

In an alternative embodiment, the disclosed apparatus and methods may be implemented as a computer program product for use with a computer system. Such code may, for example, be readable by a computer system and executable by the computer system. Such implementation may include a series of computer instructions fixed either on a tangible medium, such as a non-transient computer readable medium (e.g., a diskette, CD-ROM, ROM, FLASH memory, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of this disclosure may be implemented as a combination of both software (e.g., a computer program product) and hardware. Still other embodiments of this disclosure are implemented as entirely hardware, or entirely software.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

The embodiments described above are intended to be merely exemplary; numerous variations and modifications will be apparent to those skilled in the art. All such variations and modifications are intended to be within the scope of the present disclosure as defined in any appended claims.

What is claimed is:

1. A computer-based communication platform comprising:
   a portal generator configured to generate a plurality of separate portals, each portal being accessible by a plurality of municipal groups, each municipal group of the plurality of municipal groups having:
      (i) a corresponding computer aided dispatch system; and
      (ii) a corresponding secured database, the corresponding secured database accessible to the municipal group, but not directly accessible by other municipal groups of the plurality of municipal groups, the corresponding secured database having different information from the information held in at least one of the other secured database of another municipal group of the plurality of municipal groups
      such that each portal of the plurality of separate portals is coupled to a plurality of such corresponding secured databases from a corresponding plurality of municipal groups;
   a registrar configured to:
      (a) register, to the platform, each municipal group of the plurality of municipal groups, each such municipal group being a registered municipal group; and to
      (b) assign, for each registered municipal group, access to at least one of the portals as a function of information relating to registering said registered municipal group, each such registered member being a registered member of its corresponding assigned portal;
   a database interface configured to communicate with the secured databases corresponding to the plurality of municipal groups;
   a database manager configured to selectively grant access to a secured database of the plurality of municipal groups for each of the portals, said secured database being one of the plurality of such corresponding secured databases and said secured database being a requested database, said access being granted access for a given portal being a function of the registered municipal group requesting access and/or a specific requester, the granted access being for less than the entirety of the requested database, and wherein:
      the database manager is further configurable to permit different database access levels to different municipal groups and/or specific requesters, and wherein
      the database manager is configured to assign access based on one or more of a type of municipal group, a member's job rank within the registered municipal group, or a member's duration of employment within the registered municipal group; and a display manager configured to display selected information retrieved from the secured databases and showing updates, the display being configured to display different groups of information in one of a plurality of different orders.

2. The platform of claim 1, wherein, the registrar is further configured to (c) cause the portal generator to generate a new portal in response to the information relating to registering said registered municipal group.

3. The platform of claim 1, wherein the information from each secure database is accessible via the plurality of separate portals, the plurality of separate portals allowing for one or more of viewing, editing, searching, or updating the information within the portal.

4. The platform of claim 1, wherein the updates shown by the display manager are updated in real-time.

5. The platform of claim 1, wherein the plurality of different orders includes one or more of time, task, group, or responsible party.

6. The platform of claim 1, wherein the platform is configured to create at least one portal of the plurality of portals automatically in response to an event contained within the database of one or more of the municipal groups.

7. The platform of claim 1, further comprising a machine learning module configured to analyze the selected information to create tasks based on previous assignment of tasks to members of the given portal.

8. The platform of claim 1, wherein each portal of the plurality of separate portals is generated based on at least one of a geography, an event, or an incident.

9. The platform of claim 1, wherein an alarm is configured to send an electronic message to at least one of the plurality of registered municipal groups in response to a selected event recognized by a given portal.

10. A computer program product for use on a computer system for collaborating between disparate organizations, the computer program product comprising a tangible, non-transient computer usable medium having computer readable program code thereon, the computer readable program code comprising:

code for generating a plurality of separate portals, each portal being accessible by a plurality of municipal groups having computer aided dispatch systems, each municipal group of the plurality of municipal groups having:

(i) a corresponding computer aided dispatch system; and (ii) a corresponding secured database, the corresponding secured database accessible to the municipal group, but not directly accessible by the other municipal groups of the plurality of municipal groups, the corresponding secured database having different information from the information in at least one of the other secured database of another municipal group of the plurality of municipal groups;

code for registering municipal groups to one or more the plurality of portals, the code for registering municipal groups configured to (a) register, to the platform, each municipal group of the plurality of municipal groups, each such municipal group being a registered municipal group; and to (b) assign access of each registered municipal group to at least one of the portals as a function of information relating to registering said registered municipal group;

code for communicating with secured databases for the plurality of municipal groups;

code for implementing a database manager for selectively controlling access to the databases of the plurality of municipal groups for each of the portals, the selected access for a given portal being a function of the requesting municipal group and/or a specific requester, the selected access being for less than the entirety of the requested database, wherein:

the database manager is further configurable to permit different database access levels to different municipal groups and/or specific requesters, and wherein the database manager is configured to assign access based on one or more of a type of municipal group, a member's job rank within the registered municipal group, or a member's duration of employment within the registered municipal group; and code for displaying selected information retrieved from the secured databases and showing updates, the display being configured to display different groups of information in one of a plurality of different orders.

11. The computer program product of claim 10, wherein the code for selected access for a given portal is a function of the requesting municipal group and/or a specific requester, the selected access being for less than the entirety of the requested database.

12. The computer program product of claim 10, further comprising code for machine learning configured to analyze the selected information to create tasks based on previous assignment of tasks to members of the given portal.

* * * * *

UNITED STATES PATENT AND TRADEMARK OFFICE
CERTIFICATE OF CORRECTION

PATENT NO. : 12,229,724 B2
APPLICATION NO. : 17/566387
DATED : February 18, 2025
INVENTOR(S) : Phillip Henry Barrett Page 1 of 1

It is certified that error appears in the above-identified patent and that said Letters Patent is hereby corrected as shown below:

In the Claims

At Column 26, Claim number 10, Line number 11, please insert --of-- after "more" and before "the"

Signed and Sealed this
Eighth Day of April, 2025

Coke Morgan Stewart
*Acting Director of the United States Patent and Trademark Office*